Jan. 18, 1955

M. A. STICELBER 2,699,736

DOUGH SHEETING ROLLER

Original Filed Sept. 7, 1948

INVENTOR.
MERLIN A. STICELBER
BY Alfred R. Fuchs
ATTORNEY

Jan. 18, 1955

M. A. STICELBER 2,699,736

DOUGH SHEETING ROLLER

Original Filed Sept. 7, 1948

INVENTOR.
MERLIN A. STICELBER
BY Alfred R. Fuchs
ATTORNEY

United States Patent Office 2,699,736

Patented Jan. 18, 1955

2,699,736

DOUGH SHEETING ROLLER

Merlin A. Sticelber, Kansas City, Mo., assignor to Stickelber & Sons, Inc., a corporation of Missouri Original application September 7, 1948, Serial No. 48,042, now Patent No. 2,600,281, dated June 10, 1952. Divided and this application January 15, 1951, Serial No. 206,042

2 Claims. (Cl. 107—12)

My invention relates to sheeting mechanism for dough molding machines, and more particularly to sheeting rollers. This application is a division of my application Serial No. 48,042, filed September 7, 1948, now Patent No. 2,600,281, dated, June 10, 1952, on Sheeting Mechanism for Dough Molding Machines.

It is a purpose of my invention to provide a dough sheeting device that is provided with rollers that have surfaces, that the dough engages, of a material to which the dough will not stick, thus making it unnecessary to apply dusting flour to the rollers to prevent sticking of the dough pieces thereto as the same are being sheeted. The elimination of dusting flour is highly desirable because flour streaks often appear in the baked loaf of bread if dusting flour is used, as it is usually necessary to use excessive amounts of dusting flour to prevent sticking of the dough pieces to the rollers between which the same pass in the sheeting operation.

The rollers used in my sheeting mechanism for dough molding machines are of the general character described, shown and claimed in my co-pending application Serial No. 793,359, on Dough Sheeting Apparatus and Method, filed December 23, 1947. As pointed out therein, I have found out that dough, no matter how sticky, will not stick to rollers of certain plastic materials or rollers that have a dough contacting surface made of certain plastic materials. These plastic materials are synthetic resins, and the particular class of synthetic resins that have been found to act in this manner are polymers of tetrafluoroethylene. The specific material that I have found particularly adaptable for this purpose is a polytetrafluoroethylene polymer, which has no true melting point, but undergoes a solid-phase transition at 620° F., but at the temperatures at which it is used in sheeting dough the strength of the material is not impaired and the material is not affected in any manner by the dough, nor does it have any effect on the dough that engages the same, except that the dough will absolutely not stick thereto. This material will not absorb water, is substantially impermeable to moisture and does not undergo any detectable change even when exposed to weathering.

The present invention relates particularly to the structure of the rollers and specifically to the means for mounting the outer synthetic resin ply on the metallic body portion or core of the roller.

Other objects and advantages of my invention will appear as the description of the drawings proceeds. I desire to have it understood, however, that I do not intend to limit myself to the particular details shown or described, except as defined in the claims.

Figure 1:
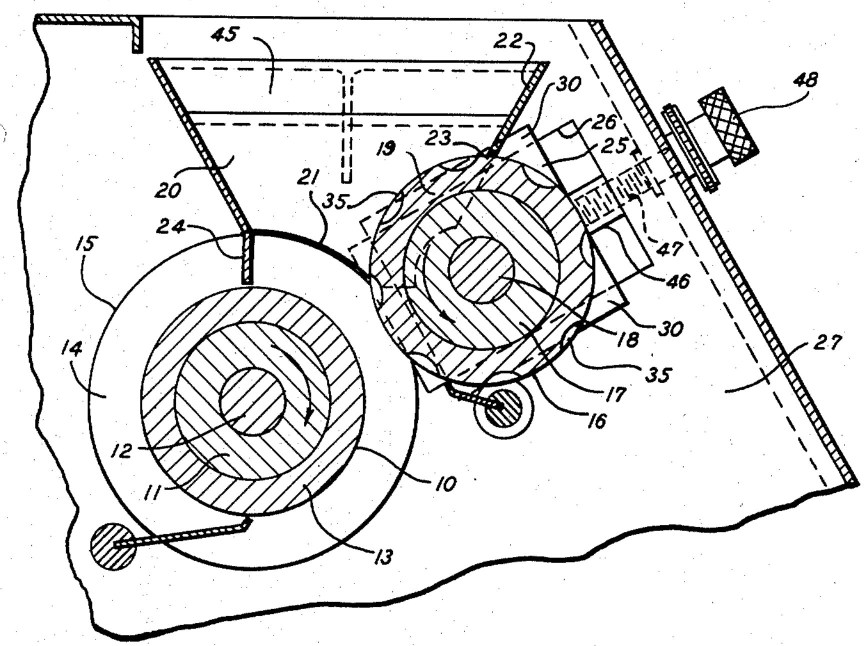
Fig. 1 is a fragmentary vertical sectional view through a set of sheeting rollers.

Referring in detail to the drawings, a downwardly tapering hopper 45 is provided, which feeds dough pieces between the roller 10 that has flanges 15 and the roller 16, which cooperates therewith to sheet dough, or in other words, to roll out the rounded pieces of dough into sheet-like form.

The roller 10 has a metal body portion 11 mounted on the shaft 12 to rotate therewith and has an outer tubular or sleeve-like portion 13 of a synthetic resin, that has the property that dough will not stick thereto, fixed on the metal core 11 so as to rotate with said metal core. A ply 14 of said synthetic resin also overlies each of the flanges 15 on the inner face thereof with which the dough will contact. The roller 16 also has a metal body portion 17 fixed on the shaft 18 and an outer cylindrical or tubular ply 19 of the synthetic resin having the above referred to property. The hopper side walls 20 are cut away on an arc 21 so as to clear the outer periphery of the ply 14 of the flanges 15 and are in alignment with said flange portions of the roller 10. The inclined wall 22 is cut away to provide an opening at 23, through which the roller 16 projects. The rollers 10 and 16 rotate in the directions indicated by the arrows thereon and the roller 16 is adjustable toward and away from the roller 10 in a manner to be described below. The bottom edge of the wall 22 and the bottom edge of the lip 24 are spaced sufficiently from the surface of the rollers 16 and 10 that there will be no frictional contact between the surfaces of said rollers and the hopper walls.

The roller 16 has its shaft 18 extending beyond the ends thereof and said shaft is mounted in adjustable bearing blocks 25, which are mounted in slots 26 in the side plates 27 and 28, and are guided by engagement with suitable angle members 29 extending lengthwise of said slots and fixed to the side walls 27 and 28. (See Fig. 3). Flanges 30 are provided on the bearing blocks 25 which engage the inner faces of the walls 27 and 28 adjacent the slots 26. The bearing blocks 25 are also provided with bosses 46 in which the ends of adjusting screws 47 are screw-threadedly engaged. Said screws have knurled heads or hand wheels 48 by means of which the same are rotated to adjust the position of the shaft 18 and thus of the roller 16. The roller 16, preferably, has the surface thereof provided with grooves 35 to provide means for gripping the rounded dough pieces to positively pull the same into cooperative relation with the rollers 10 and 16.

Figure 2:
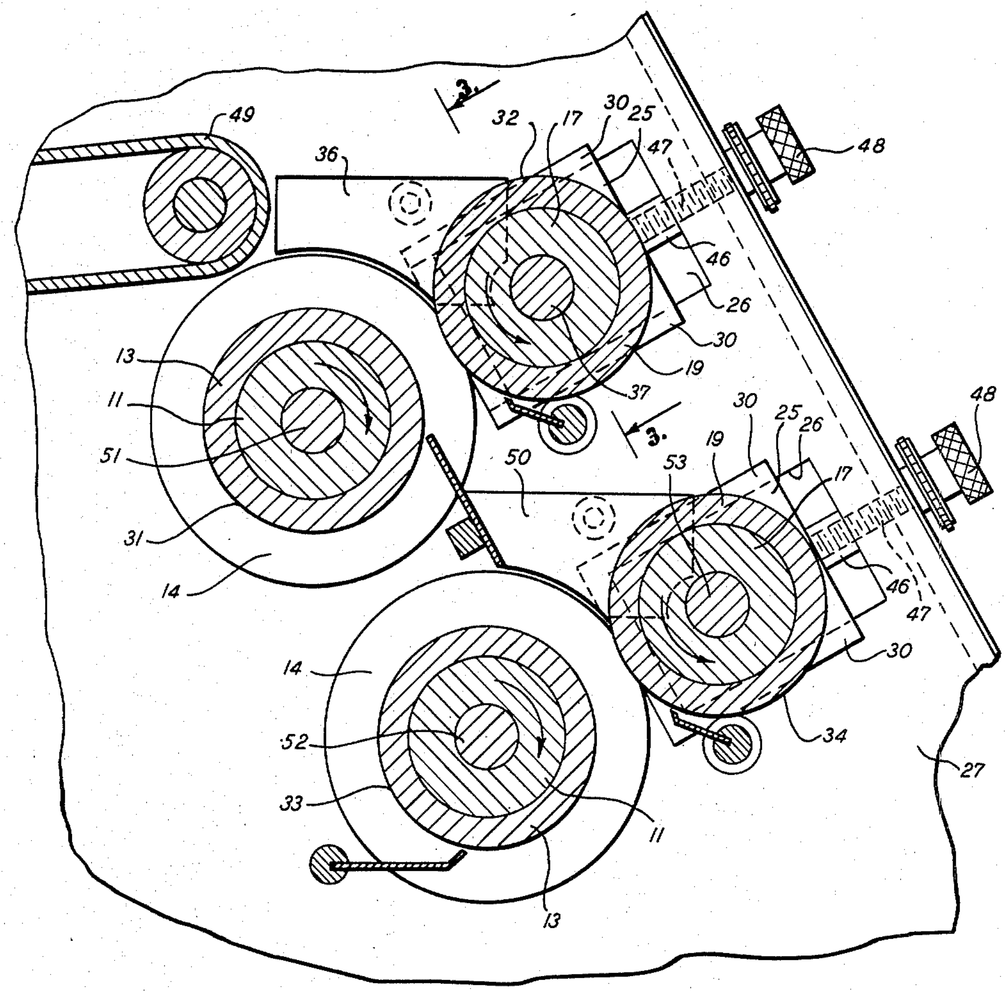
Fig. 2 is a similar view of cooperating pairs of sheeting rollers and conveying means cooperating therewith.

In Fig. 2 are shown sheeting rollers, which are similar to the rollers 10 and 16, there being an upper and a lower pair of sheeting rollers provided, the upper pair of rollers comprising a flanged roller 31, which is constructed in the same manner as the roller 10, and an unflanged roller 32, which is constructed in the same manner as the roller 16, except that the roller 16 has the surface thereof provided with the grooves 35 to provide means for gripping the rounded dough pieces. The lower set of rollers comprises a flanged roller 33, also similar to the roller 10, and an unflanged roller 34, also similar to the roller 16. In order to direct the sheeted pieces of dough traveling along the conveyor belt 49 and discharge therefrom properly into cooperative relation with the upper pair of sheeting rollers 31 and 32, guiding means are provided, comprising guide plates 36. A pair of guide plates 50 are provided, similar to the guide plates 36 but slightly different in shape.

As the detailed construction of the rollers 31 and 33 is the same as the roller 10 and the detailed construction of the rollers 32 and 34 is the same as that of the roller 16, except that these do not have the grooves 35, the same reference numerals are applied to the corresponding parts of the rollers 10, 31 and 33, and the corresponding parts of the rollers 16, 32 and 34. The rollers 31, 32, 33 and 34 rotate in the direction indicated by the arrows provided thereon in Fig. 2.

The dough pieces will be guided into position between the rollers 31 and 32 by means of the guide plates 36 and will be sheeted by the cooperative action of said rollers and will then pass toward the rollers 33 and 34.

Figure 3:
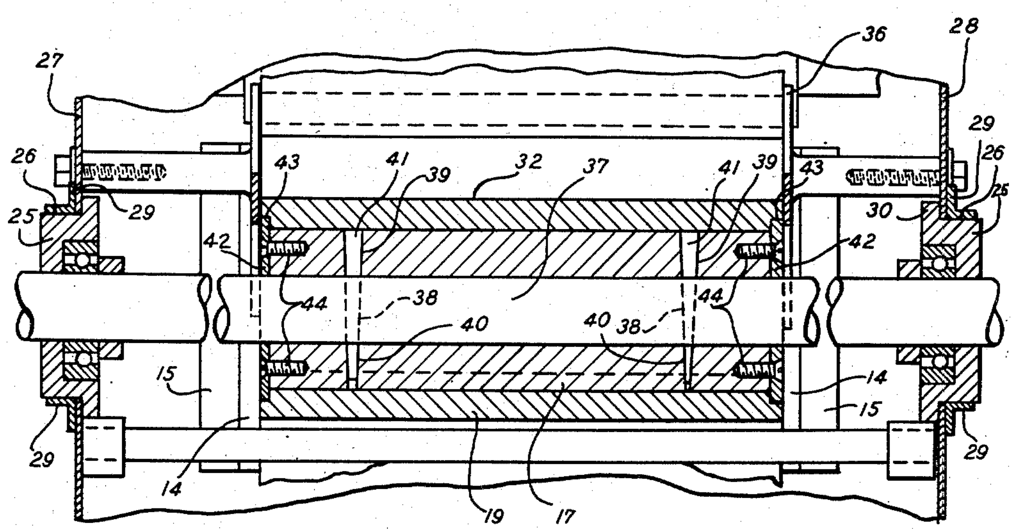
Fig. 3 is a section taken on the line 3—3 of Fig. 2, partly broken away.

The means for holding the adjustable rollers in fixed position on the shafts on which the same are mounted is shown in Fig. 3, the shaft 37 being shown as being provided with tapering openings 38 therein that align with tapering openings 39 and 40 in the metallic body portion 17 of the roller and tapering pins 41 are driven in said aligning tapering openings to fix the body portion 17 to the shaft. The rollers 31, 33 and 34 are fixed on the shafts 51, 52 and 53, respectively, in a similar manner. The outer sleeve-like synthetic resin member 19 is fixed to the body portion 17 to rotate therewith by means of clamping rings 42 that seat in recesses 43 in the ends of the tubular member 19 and which are held in clamping engagement therewith by means of the screw-threaded fastening elements 44 that engage in screw-threaded openings in the end walls of the body portion 17.

The synthetic resin that is employed in the tubular members 13 and 19 and the disk-like facings 14 is a synthetic resin that has the characteristic that dough will not stick thereto, and is rigid and unyielding, the particular material that has been found most adaptable being a polytetrafluoroethylene polymer, such as described in the patent to Plunkett, 2,230,654, patented February 4, 1941.

What I claim is:

1. A dough sheeting roller of the character described having an inner metallic load sustaining core, a polytetrafluoroethylene sleeve mounted on said core, said sleeve having seats in the end faces thereof, and means for securing said sleeve on said core comprising rings engaging the ends of said core and said seats in said sleeve, and fastening elements detachably securing said rings in fixed position on said core with the outer faces of said rings flush with the extremities of said sleeve.

2. A dough sheeting roller of the character described having an inner metallic load sustaining core, an outer tubular polytetrafluoroethylene surface covering of fixed shape mounted on said core, said surface covering having a recessed end, a metallic end member having an outer portion seated in said recess and an inner portion engaging an end face of said core, said outer portion having a flat outer face, and fastening elements detachably securing said end member to said core to hold the same in engagement with said surface covering, with said outer portion confined within said recess, said end of said surface covering having its peripheral edge portion flush with the outer flat face of said metallic end member.

References Cited in the file of this patent

UNITED STATES PATENTS

| | | |
|---|---|---|
| 102,104 | Forsyth et al. | Apr. 19, 1870 |
| 1,496,692 | Voss | June 3, 1924 |
| 1,498,180 | Linder | June 17, 1924 |
| 1,887,436 | Schacht et al. | Nov. 8, 1932 |
| 1,931,614 | Kirchhoff | Oct. 24, 1933 |
| 2,425,356 | Sticelber | Aug. 12, 1947 |
| 2,484,670 | Baker | Oct. 11, 1949 |
| 2,501,629 | Goulding | Mar. 21, 1950 |